United States Patent [19]

Givler, Jr. et al.

[11] Patent Number: 4,922,142
[45] Date of Patent: May 1, 1990

[54] METHOD AND APPARATUS FOR CONTROLLING THE CARRIAGE OF A LINEAR MOTOR

[75] Inventors: Paul W. Givler, Jr., Coatesville, Pa.; William J. Hommes, Hockessin, Del.; Cobern V. Peterson, West Grove, Pa.; Madison A. Culver, Grove City, Ohio

[73] Assignee: E. I. Du Pont de Nemours and Company, Wilmington, Del.

[21] Appl. No.: 209,909

[22] Filed: Jun. 22, 1988

[51] Int. Cl.⁵ .............................. H02K 41/02
[52] U.S. Cl. ........................ 310/12; 310/216; 318/135
[58] Field of Search .............. 310/12, 13, 26, 216, 310/261; 318/135; 104/290, 299; 198/465.2, 619

[56] References Cited

U.S. PATENT DOCUMENTS

| | | | |
|---|---|---|---|
| 3,788,447 | 1/1974 | Stephanoff | 310/12 |
| 4,638,192 | 1/1987 | von der Heide | 310/12 |
| 4,712,027 | 12/1987 | Karidis | 310/12 |
| 4,724,349 | 2/1988 | Grimm et al. | 310/216 |
| 4,825,111 | 4/1989 | Hommes | 310/12 |

FOREIGN PATENT DOCUMENTS

| | | | |
|---|---|---|---|
| 259240 | 5/1913 | Fed. Rep. of Germany | 310/12 |
| 847456 | 7/1981 | U.S.S.R. | 310/12 |

Primary Examiner—Patrick R. Salce
Assistant Examiner—D. L. Rebsch

[57] ABSTRACT

The method and apparatus for controlling the travel of a carriage of a linear motor along the motor primary by providing a wedge shaped member adjacent the entrance or exit of the electromagnetic field of the primary.

13 Claims, 3 Drawing Sheets

METHOD AND APPARATUS FOR CONTROLLING THE CARRIAGE OF A LINEAR MOTOR

FIELD OF THE INVENTION

This invention relates to a method and the apparatus for controlling the movement of the carriage of a linear motor by having a synchronous secondary attached to the carriage interact with an adjacent controlled-volume wedge-shaped ferromagnetic material.

BACKGROUND OF THE INVENTION

Synchronous linear motors generally comprise a carriage having permanent magnets, with the carriage being mounted for movement adjacent to a primary made of ferromagnetic material and which may be electrically energized to also interact with the synchronous secondary, or other propulsion means not associated with the synchronous secondary may be employed.

A description of such a synchronous linear motor is illustrated in commonly owned U.S. patent application Ser. No. 115,791 filed Nov. 2, 1987, now U.S. Pat. No. 4,825,111, and the disclosure therein is incorporated herein by reference. The linear motor carriage will usually carry a tool to perform some type of work while passing through a work station.

In certain applications of synchronous linear motors, it is necessary for the primary to be discontinuous and have discrete ends. When this is the case, the linear motor carriage with attached synchronous secondary must approach the leading end and leave the trailing end of the primary. The carriage may be separately propelled by contact with an adjacent carriage or propulsion by a second attached synchronous secondary. Approaching and leaving the ends of the primary creates a problem because of the change in force acting on the secondary at the ends of the primary. The primary consists of ferromagnetic material, usually steel laminations, that interact magnetically with the magnetic poles of the synchronous secondary. The secondary poles are often provided by permanent magnets. As the magnets of the secondary are moving through the space preceding the primary and then approach the leading end of the primary, they are attracted strongly to the ferromagnetic end of the primary, so a large force unbalance exists on the secondary. This strong attraction may make the secondary motion speed up if there is insufficient restraint on the secondary. When the secondary reaches the leading end of the primary it comes under the influence of any moving electromagnetic wave in the primary. If the speed of the EM wave is different from the speeded up motion of the secondary, a disturbance in the motion of the secondary results. This is often the case and is frequently undesirable. The secondary magnet is also attracted to the rectangular horizontal surface of the primary while moving between its ends, but this results in a balanced force on the secondary which has no effect on the speed of the secondary.

The opposite effect occurs as a synchronous secondary leaves the trailing end of the primary. As the magnet tries to move away from the trailing ferromagnetic end, an unbalanced force on the magnet exists and the secondary motion is slowed down excessively if there is no driving force on the secondary. Once again, a disturbance in the motion of the secondary often results and is frequently undesirable.

In some cases, a moveable structure must be provided in a linear motor track to allow the carriage to change direction. At the points of movement, it is not practical to provide a continuous linear motor primary structure or other controllable propulsion means for the linear motor carriage. The carriage with synchronous secondary attached must be moved between portions of discontinuous propulsion means which do not interact with the synchronous secondary. Some simple economical means of alternate propulsion for the carriage must be provided to move the carriage from one controllable propulsion means to another.

SUMMARY OF THE INVENTION

Wedge - Force Reduction

It has been found that the force and motion disturbances on a synchronous secondary approaching the leading end and leaving the trailing end of a primary can be minimized by providing a controlled-volume ferromagnetic end to the primary. This is most conveniently accomplished by providing a ferromagnetic wedge on the ends of the primary. In this way, the ferromagnetic volume does not go abruptly from zero to a large volume or vice versa.

When doing this, the increase in force between the magnet of the secondary and the controlled-volume ferromagnetic end of the primary results in a controlled attraction force over a long distance which limits the forces that would speed up or slow down the secondary.

Double-Wedge - Propulsion

In cases where a carriage with a synchronous secondary is moving between portions of controllable propulsion means and is not passing adjacent a primary or propelled by a primary, a wedge-shaped ferromagnetic device interacting with the secondary has been found to provide simple low cost propulsion for the carriage. To remove the carriage from the influence of the wedge with a low resistant force, it has been found useful to provide another wedge having its base abutted with the base of the first wedge to thereby form a double-wedge to provide a low resistant force as the secondary leaves the first wedge. This double-wedge shaped propulsion device can be usefully employed, then, to move synchronous secondaries between discontinuous sections of primary or other propulsion means which are not interacting with the synchronous secondary.

It is the purpose of this invention to provide a method and apparatus to control the force imbalance in the direction of motion on the carriage of a synchronous linear motor when adjacent an interacting volume of ferromagnetic material of the primary of the motor.

It is an object of this invention to provide a controlled-volume of ferromagnetic material in a wedge-shaped device to thereby interact with the magnetic pole or poles of the synchronous secondary to create a controlled force imbalance on the secondary.

It is also an object of this invention to provide a means of reducing the force in the direction of motion of a synchronous secondary approaching the leading end of a ferromagnetic primary and reducing the force opposite the direction of motion of a synchronous secondary leaving the trailing end of a ferromagnetic primary. The preferred means consists of single wedge-shaped ferromagnetic devices placed abutting the ends of the primary.

It is a further object of this invention to provide means of propelling a synchronous secondary between other discontinuous propulsion means not associated with the synchronous secondary by providing a controlled-volume of ferromagnetic material adjacent the secondary to move it in a preferred direction, and reducing the force opposite the direction of motion of the synchronous secondary as it leaves the controlled-volume of ferromagnetic material. The preferred means consists of a double-wedge-shaped ferromagnetic device placed to overlap and span between the ends of the discontinuous propulsion means.

It is an additional object of this invention to provide a single or double wedge-shaped device that provides a controlled force on a synchronous secondary, which force is substantially unaffected by the speed of the secondary. The preferred device consists of a structure made from laminated sheets of ferromagnetic material electrically insulated from one another.

DESCRIPTION OF THE PREFERRED EMBODIMENTS

Figure 1:
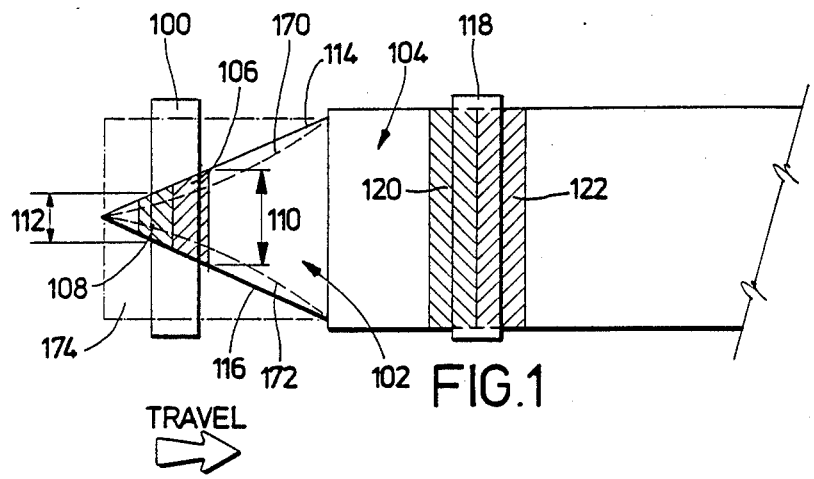
FIG. 1 and 1A are diagramatic illustrations of the interaction between a moving magnet and a controlled volume of ferromagnetic material.

FIG. 1 illustrates how control of force occurs because of an imbalance in the volume of the ferromagnetic material near a magnet such as is found on a linear motor synchronous secondary. The theory discussed referring to FIG. 1 is not meant to limit the invention, but is merely one way to understand the observed results of the invention.

The magnet and the volume of the ferromagnetic (FM) material adjacent the magnet interact to produce a force on the magnet approximately proportional to the volume of the ferromagnetic material, assuming the gap 169 between the magnet and ferromagnetic material is constant. In the plan view of FIG. 1, referring to magnet 100 adjacent ferromagnetic wedge 102 at the leading end of the FM material of primary 104, the interacting volume of FM material at the forward half portion of the magnet is shown shaded at 106. The interacting volume of FM material at the rearward half portion of the magnet is shown differently shaded at 108. The vertical component of the volume can be seen as the shaded portions in the elevation view of FIG. 1A. These two volumes are obviously different because of the angled shape of the wedge and can be represented by the lengths of the FM material under the forward and rearward edges of the magnet at 110 and 112 respectively. Because these two volumes are different, the magnetic forces on the forward and rearward portions of the magnet are different. In the case in FIG. 1, there is a greater force on the forward portion of the magnet, so there is a net unbalanced force to the right in the direction of motion of the secondary. Because the angle between the edges 114 and 116 of the wedge remains constant (are straight lines) and the gap remains constant, this force remains essentially constant as the magnet moves along the wedge. This is because the interacting volume difference remains constant, or in other words, the difference in length of lines 110 and 112 remains the same as the magnet moves along the angled portion of the wedge.

Referring to magnet 118 which is adjacent the rectangular FM material of the primary 104, the interactive volumes 120 and 122 of FM material adjacent the forward and rearward portions of the magnet are the same. This results in a zero unbalanced force on the magnet in the direction of motion due to magnetic interaction between the magnet and the FM material.

Figure 2:
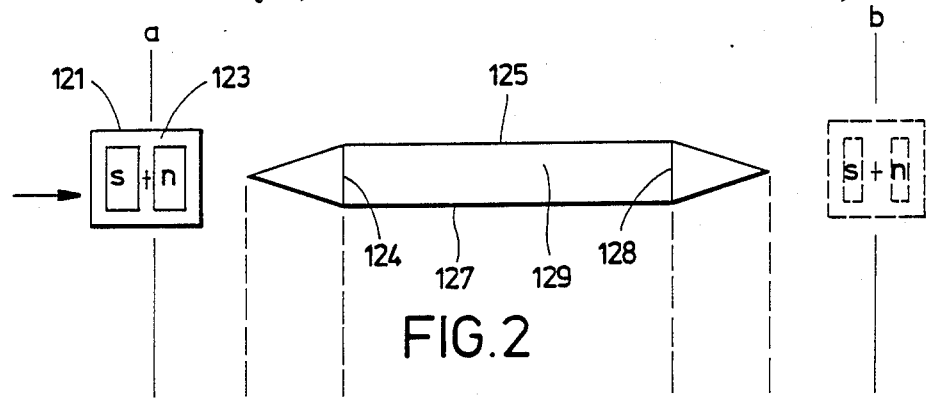
FIG. 2 is a diagramatic illustration of a carriage of a linear motor having a synchronous secondary attached that is moving adjacent a linear motor primary.
Figure 2A:
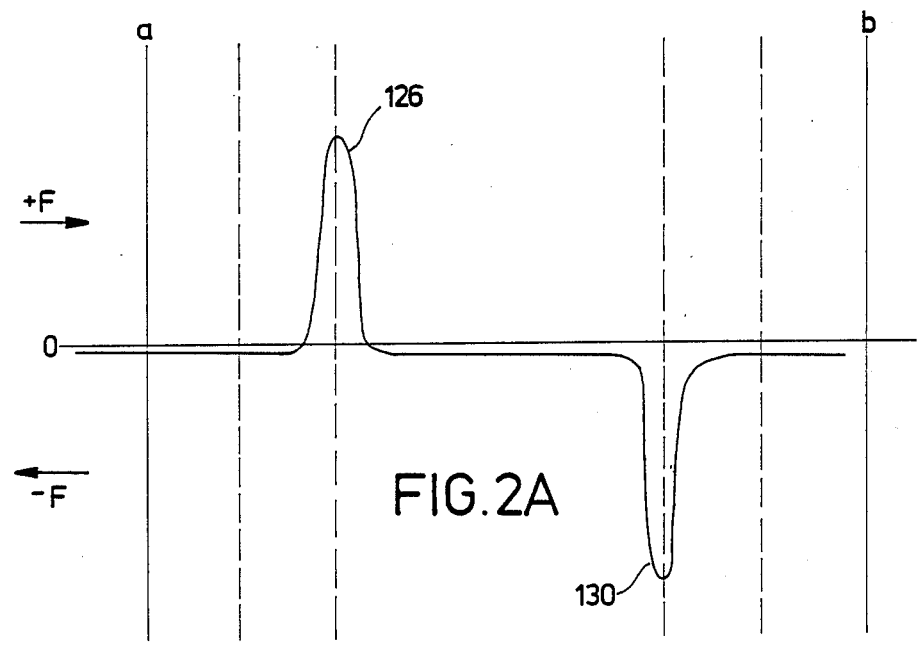
FIGS. 2A and 2B are plots of force acting on the synchronous secondary of FIG. 2 versus position along FIG. 2.

FIG. 2 shows a view of a carriage 121 having a synchronous secondary 123 approaching the leading end of a primary 129 with the secondary externally constrained to travel at a slow constant speed. The forces created in the direction of motion between the secondary magnets and the FM material of the primary, or the FM material of the wedge and primary, are plotted in FIGS. 2A and 2B respectively. For this discussion, it is assumed there is no propulsion by the primary 129. In the force vs position plot of FIG. 2A without the wedge, the force on the secondary increases rapidly in the direction of motion of the secondary as it reaches the leading end 124 of the primary FM material as shown by the plot at 126. This force drops to about zero as the secondary travels along the primary FM material. Actually, a slight force ripple may exist as the secondary moves across the alternating teeth and slots of the primary. As the secondary leaves the trailing end 128 of the primary FM material, the force on the secondary increases rapidly in the direction opposite the direction of motion of the secondary as shown by the plot at 130. The high forces as at 126 and 130 tend to disturb the motion of the secondary and are undesirable.

Figure 2B:
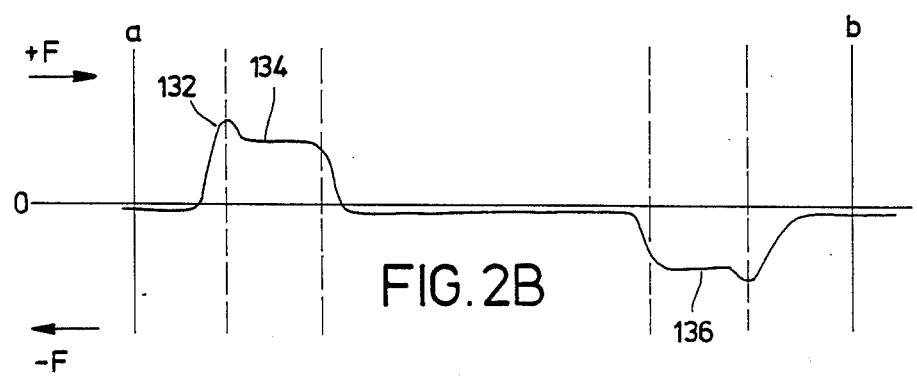

FIG. 2B shows the forces on the secondary when the wedge of the invention is employed. As the secondary reaches the tip of the wedge there is an increase in force at 132 in the direction of secondary motion, but since the area of the wedge at its tip is small, the increase in force is much smaller than at 126 in the plot of FIG. 2A. As the secondary moves along the wedge the force remains at a constant low level at 134. As the secondary moves off the base of the wedge, the force drops to zero and remains essentially at zero as the secondary moves along the FM material of the primary which has parallel edges 125 and 127. As the secondary leaves the trailing end of the primary at 128, there is an increase in force at 136 in a direction opposite the motion of the secondary as the secondary moves over the tapering FM material of the wedge. This increase in force, however is much less than the force at 130 in the plot of FIG. 2A. The wedge has reduced the force change as a secondary approaches the leading end and leaves the trailing end of the primary so the disturbance to secondary motion is controlled to be an insignificant level.

In the absence of other forces, when the constant force developed between a wedge and a magnet as previously described is applied to the magnet over the distance of the wedge, it causes the magnet attached to a secondary carriage to be propelled along the wedge. The magnet will continue to be propelled until the width of the wedge nearly equals the width of the magnet. At that point, the difference in interacting volumes presented to the forward and rearward magnet portions approaches zero so the propulsion force drops to a value less than frictional retarding forces on the secondary carriage and the carriage stops moving. At that point, however, there is now a problem of how to get the magnet off the wedge without having to overcome a high resistant force if the carriage is to continue moving. It has been found that another wedge having its base abutted with the base of the first wedge can be used as a double-wedge to provide a low resistant force as the secondary leaves the double-wedge. This double-wedge shaped propulsion device can be usefully employed, then, to move synchronous secondaries between discontinuous sections of primary or other propulsion means which are not interacting with the synchronous secondary. The exact distance over which the wedge can propel the synchronous secondary depends on the strength of attraction between the wedge and the magnet, the resisting frictional or other forces, and the width of the magnet. These factors determine the angle of the wedge which affects the difference in interacting volumes between the forward and rearward portions of the magnet. The angle of the wedge then determines the distance the magnet travels before the wedge width equals the magnet width.

Figure 4:
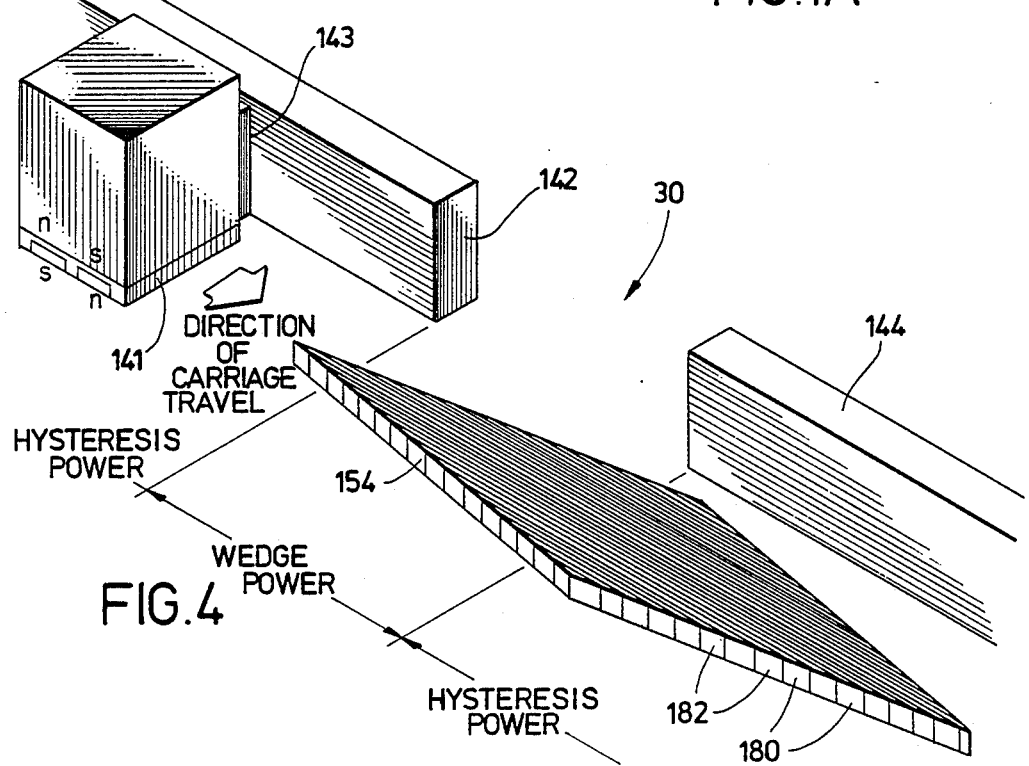
FIG. 4 is a diagramatic illustration of the laminated wedge shaped member used to move a synchronous secondary on a carriage between discontinuous portions of primary that propel a hysteresis secondary attached to the same carriage.
Figure 3:
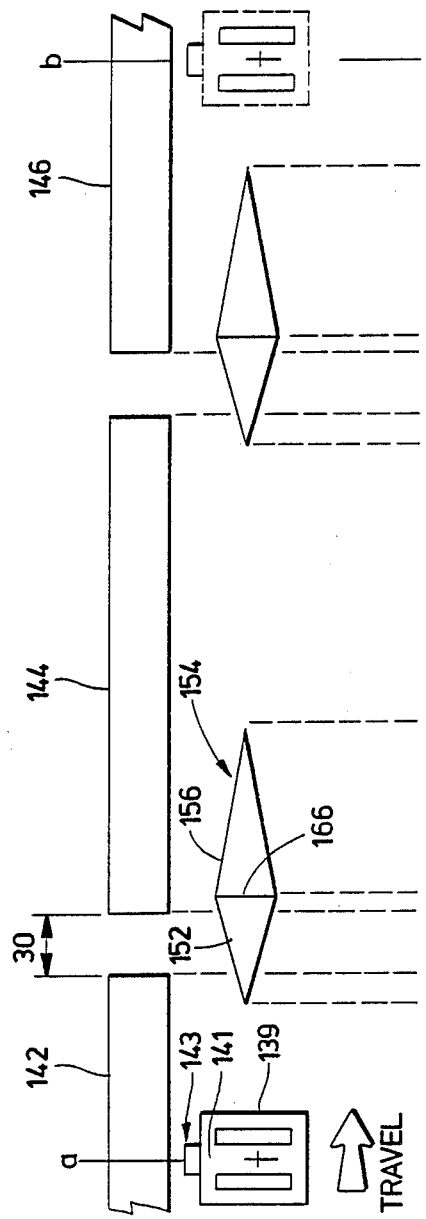
FIG. 3 is a diagramatic illustration of a carriage of a linear motor having a synchronous secondary and a hysteresis secondary attached, the synchronous secondary not moving adjacent a primary.
Figure 3A:
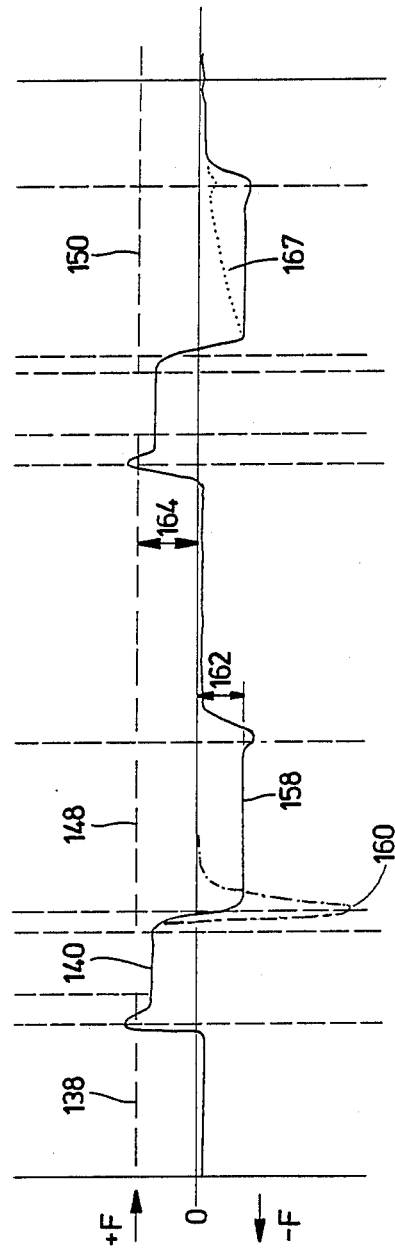
FIG. 3A is a plot of force acting on the synchronous secondary of FIG. 3 versus position along FIG. 3.

FIG. 3 shows a view of a carriage 139 having a synchronous secondary 141 moving past several discontinuous propulsion devices 142, 144, and 146 which do not interact with the synchronous secondary. Such propulsion devices may be sections of linear motor primary that interact with a hysteresis secondary 143 mounted on the same carriage as, but on a different side than, the synchronous secondary. This arrangement is also shown in FIG. 4 where hysteresis secondary 143 moves adjacent primaries 142 and 144, and synchronous secondary 141 moves adjacent double-wedge 154. Space 30 occurs between the discontinuous portions 142 and 144 of linear motor primary. Referring to FIG. 3A, an available force in the direction of motion is provided to the carriage by the primaries acting on the hysteresis linear motor secondary by the forces designated by the intermittent lines in the plot at 138, 148, and 150. The actual force available is dependent on the resistance to motion of the carriage. The force provided by the left half 152 of the double-wedge 154 acting on the synchronous secondary on the carriage is shown at 140. This force keeps the carriage moving to the right after it has left propulsion device 142 and until it is adjacent the next propulsion device 144. The right half 156 of the double-wedge 154 then provides a low force level 162 plotted at 158 which is less than the available propulsion force level 164 of the primary acting on the hysteresis secondary, so the carriage will continue moving to the right off of the double-wedge since the available force is greater than the resisting right half wedge force. If the right half of the double-wedge were absent and the synchronous secondary had to be removed from the base of the left half wedge at 166, the dot-dash plot shows that a high force 160 would be required. Since this force level is greater than the propulsion force level 164, the carriage would stop moving and would remain at the base of the left half wedge. The right half wedge shape approaches as much as is practical, the parallel sides of the primary shown in FIG. 2. This would provide a zero force to overcome, but then the wedge would never end. The smaller the angle, however, the smaller the differential wedge-force developed that must be overcome by the propulsion device.

Figure 1A:
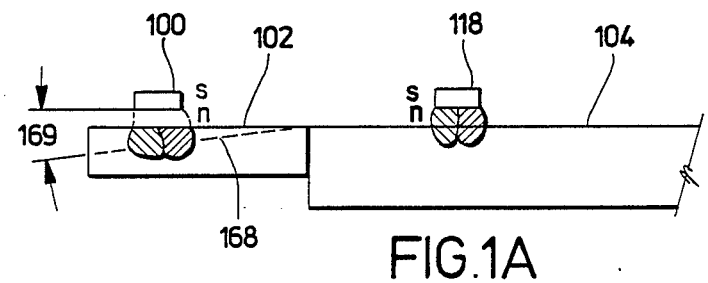

A special variation of the right half wedge, that may be useful to reduce the resisting force for the synchronous secondary to leave the wedge, is to increase the gap between the wedge and the magnets as the magnet moves along the wedge from the base to the tip. Such a changing gap 169 is illustrated in FIG. 1A by the dashed line 168. This would result in a gradually decreasing wedge force shown on the plot by the dotted line at 167 in FIG. 3A. This changing force as the magnet moves along the wedge with a changing gap occurs because the relationship between the gap and the magnetic force is exponential, not linear, as is the volume relationship. If the gap control phenomenon is utilized, the wedge shape may be eliminated entirely as long as the ferromagnetic device shape is the same width as the primary as illustrated in FIG. 1A by the intermittent dot and dash line 174; this eliminates a sudden interacting volume change between the FM device and the primary. Control of the force between the magnet and FM material of the control device is more difficult with the varying gap technique, however, since small tolerance variations in the gap from carriage to carriage produces significant differences in the controlled force.

It has been found useful, however, to provide a rapidly increasing gap at the tip of the wedge to decrease the force peak there such as is shown at 132 in FIG. 2B. It is also important to keep the tip of the wedge sharp pointed and not radiused to minimize the force peak.

An alternative to the varying gap technique to obtain a decreasing controlled force is to vary the angled edges of the wedge to be curved toward each other as illustrated by the long dashed lines at 170 and 172 in FIG. 1. In this case, the difference in interacting volumes of ferromagnetic material is not constant, but would decrease moving from the base to the tip of the wedge. The edges of the wedge could also curve outward away from each other to produce a different varying force.

Although the edges of the wedge have been shown as varying symmetrically about the center of the wedge, they may be non-symmetric. For instance, the plan view of the wedge may be shaped like a right triangle instead of the isosceles triangle shown and the effect with the magnet would be the same.

When the wedge-shaped device is fabricated from a solid block of ferromagnetic material, there is a problem that as the magnet is propelled at a rapid speed past the solid block, eddy currents are induced in the block that interact with the magnet to oppose its motion. This opposing force increases as the relative speed between the magnet and the solid block of FM material increases. In the case just discussed for FIG. 3A where there is a problem propelling the magnets off the right half wedge, the force required to do so would increase with speed until the force 162 would be greater than the propulsion force 164 and the carriage would slow down excessively, or in the extreme even stop moving; this is undesirable. At sufficiently high speeds, the opposing force on even the left wedge can become sufficiently high that the force at 140 can become negative. It has been found that the increase in force with speed can be overcome by fabricating the wedge from thin ferromagnetic sheets 180 laminated between thin sheets of electrical insulation 182 (see FIG. 4). The sheet thickness is exaggerated for clarity. This structure is the same as the typical laminated motor core of a linear motor primary except no slots are required to hold coils of wire. The thin sheets would preferably be oriented with their long axis in the direction of motion of the secondary magnets. This structure prevents large currents from circulating perpendicular to the direction of motion (across the wedge), since the current cannot circulate beyond the individual insulated sheets. Perpendicularly circulating forces act as braking forces and therefore oppose carriage motion. By using laminated wedges, these braking forces are minimized so no significant resisting force is generated by the motion of the magnet along the wedge. FIG. 4 shows such a laminated double-wedge structure of the invention. The laminations can also be used to fabricate the single force reduction wedge.

We claim:

1. A method of controlling the movement of a carriage having synchronous linear motor secondary attached, the carriage travelling along an elongated track, comprising the steps of:
    propelling the carriage at two discontinuous portions along the track by a propulsion means;
    propelling the carriage between the discontinuous portions by exposing the synchronous secondary to a controlled volume of ferromagnetic material spaced from the secondary, wherein the controlled volume is first increasing and then decreasing in the direction of travel.

2. The method of claim 1, wherein the controlled volume of ferromagnetic material is solid.

3. The method of claim 1, wherein the controlled volume of ferromagnetic material comprises layers of ferromagnetic material having insulating layers placed therebetween with the layers of ferromagnetic material being aligned with the direction of carriage travel and the edge of the layers are adjacent the synchronous secondary.

4. The method of claim 1 wherein the increasing controlled volume extends from one portion to the other and the decreasing controlled volume extends along the other portion in the direction of carriage travel.

5. The method of claim 3 wherein the controlled volume has a changing surface area exposed to the secondary.

6. The method of claim 1 wherein the controlled volume is spaced at a changing distance from the secondary.

7. The method of claim 1 wherein the controlled volume has a changing surface area spaced at a changing distance from the secondary.

8. The method of claim 1 wherein the propulsion means is a hysteresis linear motor having a hysteresis secondary attached to the carriage.

9. A system for propelling a carriage with discontinuous propelling means, comprising:
    a carriage having a salient magnetic pole on one side;
    a first portion of a propulsion means engaging another side of the carriage, the propulsion means having an exit end;
    a second portion of a propulsion means engaging this other side of the carriage, the propulsion means having an entrance end, and the entrance end being spaced from the first portion exit end, and the first and second portions being adapted to propel the carriage in a direction from the first portion to the second portion; and
    a controlled volume of ferromagnetic material spaced from the pole side of the carriage and extending from before the exit end to beyond the entrance end, wherein a first part of the controlled volume is increasing from the exit end to the entrance end and a second part is decreasing from the entrance end along the second portion for the remainder of the controlled volume.

10. The system of claim 9, wherein the controlled volume is a double wedge shaped volume wherein the first part is of increasing surface area facing the carriage and in the direction of carriage travel, and the second part is of decreasing surface area, the areas being uniformly spaced from the pole side of the carriage.

11. The system of claim 9, wherein the controlled volume is a double wedge shaped volume and wherein the space to the pole side of the carriage for the first part is decreasing in the direction of carriage travel and the space for the second part is increasing, the area facing the carriage remaining constant.

12. The system of claim 9, wherein the controlled volume is a double wedge shaped volume and wherein the surface area and the space varies.

13. The system of claim 9, wherein the propulsion means is a linear hysteresis motor having a hysteresis secondary attached to the other side of the carriage.

* * * * *